(12) United States Patent
Golshany et al.

(10) Patent No.: US 10,337,906 B2
(45) Date of Patent: Jul. 2, 2019

(54) SYSTEM AND METHOD FOR DETERMINING A LOAD CAPABILITY

(71) Applicant: THE BOEING COMPANY, Chicago, IL (US)

(72) Inventors: Sina S. Golshany, Lynnwood, WA (US); Gnanulan Canagaratna, Everett, WA (US); Matthew W. Orr, Kirkland, WA (US); Andrew W. Fassmann, O'Fallon, MO (US); Daniel Wajerski, Bellevue, WA (US)

(73) Assignee: THE BOEING COMPANY, Chicago, IL (US)

( * ) Notice: Subject to any disclaimer, the term of this patent is extended or adjusted under 35 U.S.C. 154(b) by 250 days.

(21) Appl. No.: 15/415,585

(22) Filed: Jan. 25, 2017

(65) Prior Publication Data

US 2018/0209837 A1    Jul. 26, 2018

(51) Int. Cl.

| | |
|---|---|
| *G01G 19/07* | (2006.01) |
| *G08G 5/00* | (2006.01) |
| *G06Q 10/08* | (2012.01) |
| *G06Q 10/04* | (2012.01) |
| *G05D 1/00* | (2006.01) |
| *G07C 5/08* | (2006.01) |
| *B64F 5/60* | (2017.01) |
| *G06Q 50/30* | (2012.01) |
| *G06Q 10/06* | (2012.01) |

(52) U.S. Cl.
CPC ............. *G01G 19/07* (2013.01); *B64F 5/60* (2017.01); *G05D 1/0055* (2013.01); *G06Q 10/04* (2013.01); *G06Q 10/083* (2013.01); *G07C 5/0841* (2013.01); *G08G 5/0034* (2013.01); *G08G 5/0039* (2013.01); *G06Q 10/06312* (2013.01); *G06Q 50/30* (2013.01)

(58) Field of Classification Search
None
See application file for complete search history.

(56) References Cited

U.S. PATENT DOCUMENTS

| | | | |
|---|---|---|---|
| 2007/0255489 A1* | 11/2007 | Jensen | G01G 19/07 701/124 |
| 2014/0244078 A1 | 8/2014 | Downey et al. | |
| 2015/0100184 A1 | 4/2015 | Nathan et al. | |
| 2015/0279218 A1* | 10/2015 | Irrgang | G08G 5/0039 701/3 |

(Continued)

OTHER PUBLICATIONS

Aircraft Weight and Balance Handbook, 2016, U.S. Department of Transportation, Federal Aviation Administration, 114 pgs.

(Continued)

*Primary Examiner* — John C Kuan
(74) *Attorney, Agent, or Firm* — Toler Law Group, P.C.

(57) ABSTRACT

In a particular implementation, a method includes generating an initial weight estimate associated with an aircraft based on a reference operational empty weight (OEW) and at least one of a latitude or an altitude of the aircraft at a first location. The reference OEW is predetermined at a second location that is distinct from the first location. The method includes determining an additional load capability of the aircraft based on a difference between the initial weight estimate and the reference OEW. The method further includes generating an output that indicates the additional load capability.

20 Claims, 6 Drawing Sheets

(56) References Cited

U.S. PATENT DOCUMENTS

2016/0041305 A1    2/2016   Stulken et al.
2016/0131517 A1*   5/2016   Mizrahi ................. G01G 23/01
                                                                                                           702/101
2017/0116617 A1*   4/2017   Nance .................... G01G 19/07

OTHER PUBLICATIONS

Does Take-off Weight Vary with Latitude?—Science Questions, Jun. 27, 2010, <http://www.thenakedscientists.com?HTML/questions/questions/2693>, 2 pgs.

Pinsker, W. J. G., "The Effect of Variations in Local Gravity and of Aircraft Speed on the Effective Weight of Aircraft in High Performance Cruise," Aeronautical Research Council Reports and Memoranda, 1972, Ministry of Defence, 16 pgs.

* cited by examiner

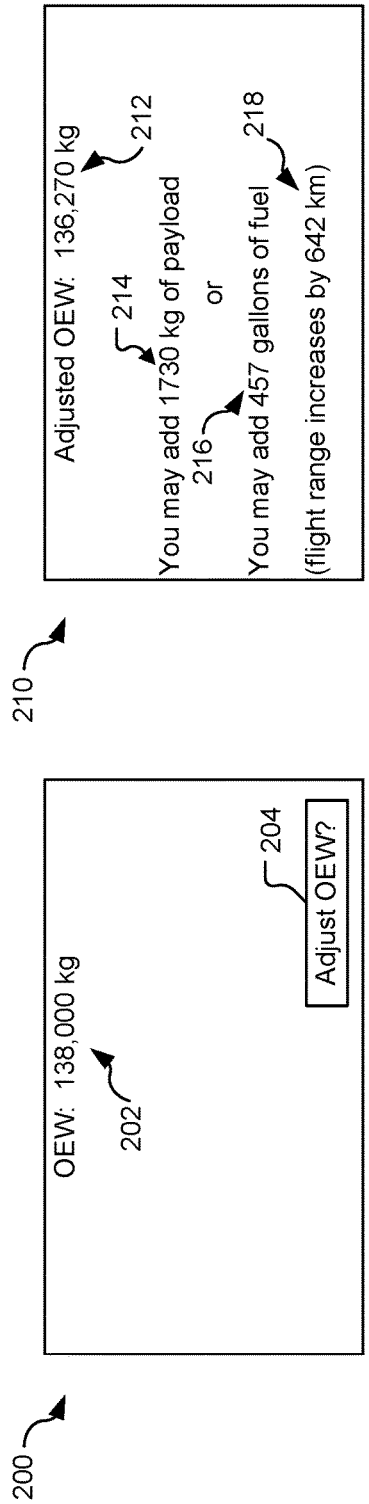
FIG. 2A
FIG. 2B
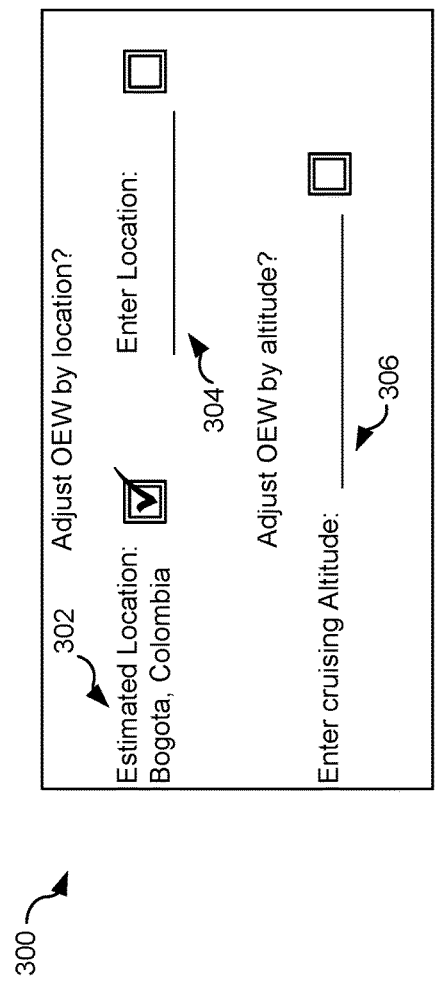
FIG. 3

SYSTEM AND METHOD FOR DETERMINING A LOAD CAPABILITY

FIELD OF THE DISCLOSURE

The present disclosure is generally related to a load capability.

BACKGROUND

Vehicles, such as aircraft, may be weighed after manufacture to determine an operational empty weight (OEW). For example, the OEW of a vehicle represents the weight of the vehicle before crew, equipment, passengers, payload, fuel, and other items are loaded onto the vehicle. After the vehicle is loaded for operation, an operational weight (e.g., a takeoff weight (TOW) if the vehicle is an aircraft) may be determined without weighing the loaded vehicle. To illustrate, the OEW may be added to the combined weight of the crew, the equipment, the passengers, the payload, etc., to determine the operational weight. For some vehicles, a maximum operational weight (e.g., a maximum takeoff weight (MTOW) if the vehicle is an aircraft) associated with safe operation of the vehicle may be specified, such as by a manufacturer or a regulatory agency. Additionally, a maximum operational weight may be associated with a particular location (e.g., an airport) at which the vehicle is located or is to be operated. In order to satisfy an operational weight criterion, the vehicle may be loaded with a particular amount of payload or fuel (or other elements) such that the operational weight does not exceed the operational weight criterion.

Revenue or cost associated with operation of a vehicle may be related to the amount of payload that is carried by the vehicle at a given time. For example, revenue to an airline may be related to the amount of payload or cargo that can be carried by an aircraft. Additionally, the maximum range associated with vehicle is based on the amount of fuel that can be carried by the vehicle, and the utility (e.g., usefulness) of the vehicle may be at least partially based on the maximum range. Because the OEW may limit the amount of fuel, the amount of payload, etc., that may be carried by the vehicle, the OEW may limit the revenue associated with the vehicle or the utility of the vehicle.

SUMMARY

In a particular implementation, an apparatus includes a processor and a memory coupled to the processor. The memory stores instructions that, when executed by the processor, cause the processor to perform operations including generating an initial weight estimate for an aircraft based on a reference operational empty weight (OEW) and at least one of a latitude or an altitude associated with the aircraft at a first location. The reference OEW is predetermined at a second location that is distinct from the first location. The operations also include determining an additional load capability of the aircraft based on a difference between the initial weight estimate and the reference OEW. The operations further include generating an output that indicates the additional load capability.

In another particular implementation, a method includes generating an initial weight estimate for an aircraft based on a reference operational empty weight (OEW) and at least one of a latitude or an altitude associated with the aircraft at a first location. The reference OEW is predetermined at a second location that is distinct from the first location. The method includes determining an additional load capability of the aircraft based on a difference between the initial weight estimate and the reference OEW. The method further includes generating an output that indicates the additional load capability.

In another particular implementation, a vehicle includes a positioning system configured to generate position data, an input device configured to receive input data, and a route management system. The route management system is configured to generate an initial weight estimate based on a reference operational empty weight (OEW) and at least one of a latitude or an altitude at a first location. The latitude or the altitude is indicated by the position data, the input data, or both. The reference OEW is predetermined at a second location that is distinct from the first location. The route management system is configured to determine an additional load capability based on a difference between the initial weight estimate and the reference OEW. The route management system is further configured to generate an output that indicates the additional load capability.

BRIEF DESCRIPTION OF THE DRAWINGS

FIG. 2A is a diagram that illustrates a first example of an interface of a flight management computer;

FIG. 2B is a diagram that illustrates a second example of an interface of a flight management computer;

FIG. 3 is a diagram that illustrates a third example of an interface of a flight management computer;

DETAILED DESCRIPTION

Figure 1:
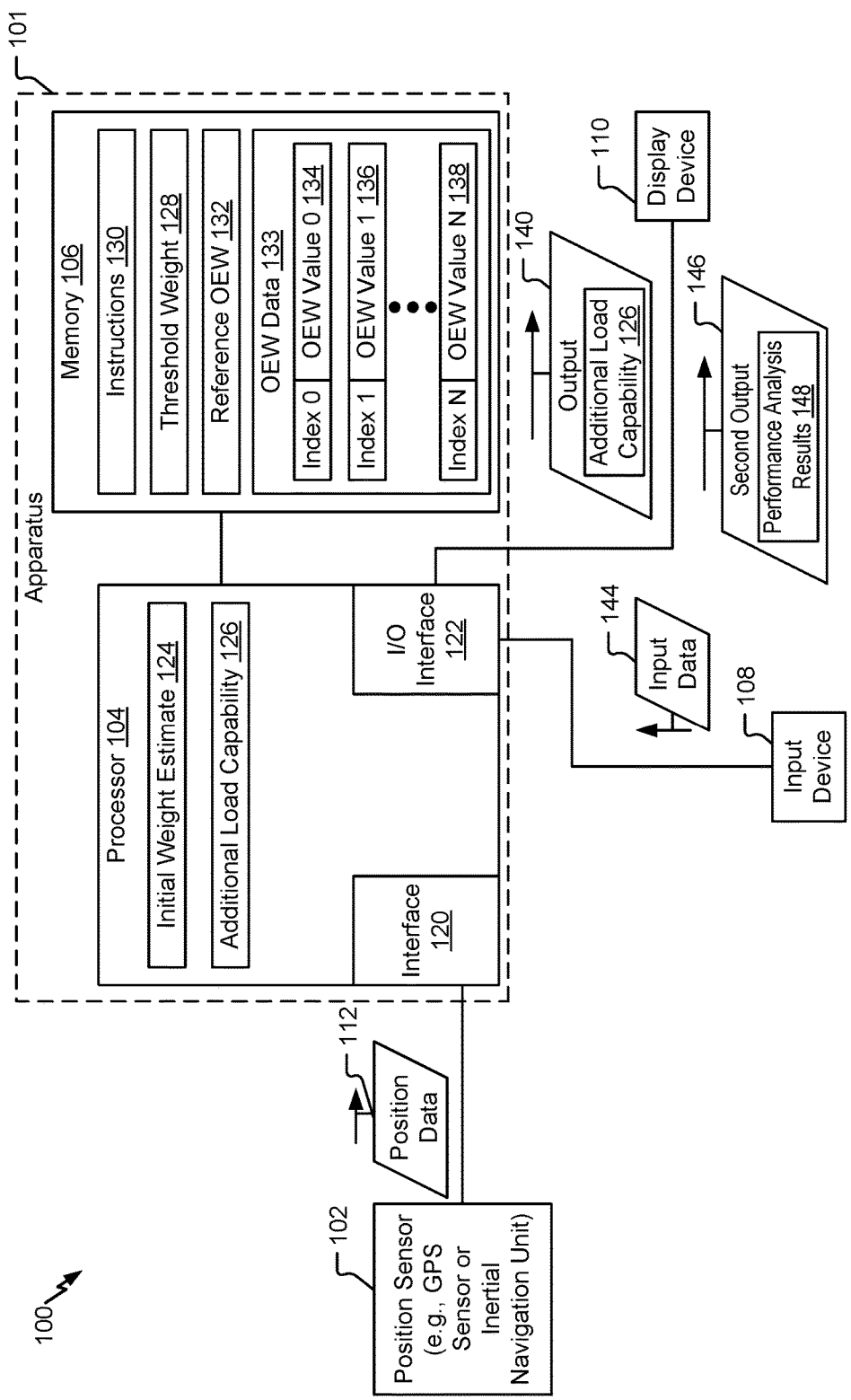
FIG. 1 is a block diagram that illustrates an example of a system that determines an additional load capability of a vehicle.

Particular implementations are described with reference to the drawings. In the description, common features are designated by common reference numbers throughout the drawings. In the description, common features are designated by common reference numbers throughout the drawings. As used herein, various terminology is used for the purpose of describing particular implementations only and is not intended to be limiting. For example, the singular forms "a," "an," and "the" are intended to include the plural forms as well, unless the context clearly indicates otherwise. It may be further understood that the terms "comprise," "comprises," and "comprising" may be used interchangeably with "include," "includes," or "including." Additionally, it will be understood that the term "wherein" may be used interchangeably with "where." As used herein, "exemplary" may indicate an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term).

As used herein, the term "set" refers to a grouping of one or more elements, and the term "plurality" refers to multiple elements.

Implementations disclosed herein are directed to systems and electronic devices (e.g., a flight management computer, a flight dispatch system, or another computing device or system) configured to determine an adjusted operational empty weight (OEW) of a vehicle that is more accurate than a predetermined reference OEW, such as a predetermined reference OEW that was determined at a time and location of manufacture or delivery of the vehicle. The adjusted OEW accounts for the strength of Earth's gravitational field at a particular location of a vehicle (or a location of intended operation of the vehicle). Because the strength of the Earth's gravitational field is different at different locations (e.g., latitude, longitude, etc.) and at different altitudes, a weight (e.g., the OEW, a loaded operational weight, etc.) associated with the vehicle may be at least partially based on the physical location of the vehicle.

As described further herein, the precise strength of the gravitational field of Earth (e.g., Earth's gravity field) varies depending on location (e.g., latitude, longitude, or both) and depending on altitude. Due to the variation of the gravitational field, the weight of a vehicle at a first location may be different than a weight of the vehicle at a second location, and the weight of the vehicle at a first altitude may be different than a weight of the vehicle at a second altitude. For example, an OEW of an aircraft measured in Seattle, Wash., is different than an OEW of the aircraft measured in Bogota, Colombia. Additionally, due to the variation of the gravitational field, the weight of the vehicle at a first altitude may be different than the weight of the same vehicle at a second altitude. For example, the OEW of an aircraft at 30,000 feet (ft) (9.1 kilometers (km)) is greater than the OEW of the same aircraft at 34,000 ft (10.4 km). Thus, the OEW of a particular vehicle varies based on location and altitude.

A system of the present disclosure, such as a flight management computer (FMC), is configured to determine an additional load capability of the vehicle based on at least one of an altitude or a location of the vehicle. To illustrate, a reference OEW that is measured at a particular location (e.g., a location of manufacture of the aircraft, a location of delivery of the aircraft, or a location of weighing of the aircraft) may be preprogrammed or stored at a memory of the system. The system is configured to generate an initial weight estimate (e.g., an adjusted OEW) associated with the vehicle based on the reference OEW and based on a location or a target altitude (e.g., an estimated cruising altitude) during operation of the vehicle. To illustrate, the system may be configured to receive position data (e.g., data indicative of a physical location of the vehicle) from a global positioning system (GPS) sensor (or other location sensor(s)). Additionally or alternatively, the system may be configured to receive, from an input device, input data that is indicative of a target location (e.g., a target location of operation of the vehicle), a target altitude (e.g., a target cruising altitude), or both. The system may access OEW data stored at the memory to determine the initial weight estimate (or an adjustment amount to apply to the reference OEW) based on the location indicated by the position data (or the input data), based on an altitude indicated by the input data (or an altitude indicated by sensor data from an altitude sensor), or both. Alternatively, the system may send data indicating the location, the altitude (e.g., the current altitude or the target altitude), or both to another device that determines adjusted OEWs (e.g., initial weight estimates) of vehicles, and the system may receive data indicating the initial weight estimate from the other device.

The system is configured to determine an additional load capacity of the vehicle based on a difference between the initial weight estimate and the reference OEW. For example, based on the latitude of the aircraft, the system may determine that the initial weight estimate is 2000 kilograms (kg) less than the reference OEW. This difference represents the additional load capability of the vehicle. After the system determines the additional load capability, the system may provide an output that indicates the additional load capability. As a particular example, a FMC of an aircraft may generate a graphical user interface (GUI) that displays an additional payload storage capability or an additional fuel storage capability (and a corresponding adjusted maximum flight range) associated with the aircraft. Additionally or alternatively, other outputs may be generated, as further described herein.

In this manner, the system may increase utility of and revenue generated by the vehicle. As a particular example, the additional load capability associated with the aircraft can be used to store additional fuel, thereby increasing the maximum range of the vehicle. Increasing the maximum range of the vehicle may increase the utility of the vehicle, such as by enabling the vehicle to travel greater distances or to refuel less frequently. As a particular example, increasing the maximum flight range of an aircraft may enable an airline to offer flights to destinations that are farther away from an airport as compared to currently offered flights, which may attract additional passengers and increase revenue to the airline. As another particular example, the additional load capability associated with the vehicle may enable the vehicle to carry more cargo during transit without an increase in cost. Increasing the amount of cargo carried during transit may enable an owner of the vehicle may be to charge a higher price for transporting cargo (or a particular amount of cargo may be transported using fewer vehicles, or fewer return trips), thereby increasing revenue to the owner.

Figure 6:
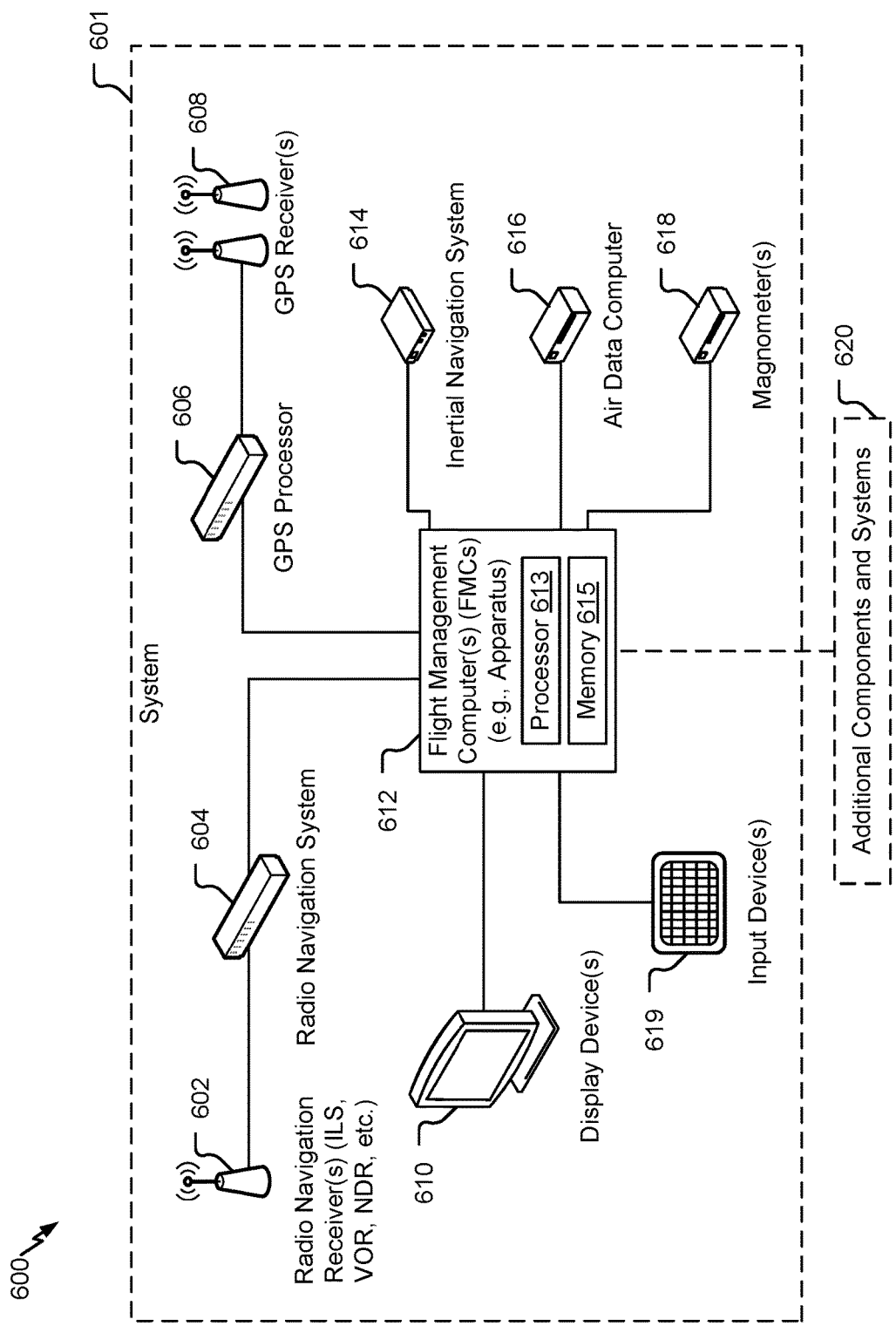
FIG. 6 is block diagram of a vehicle.

FIG. 1 illustrates an example of a system 100 configured to determine an additional load capability of a vehicle (such as a vehicle 600 shown in FIG. 6). Although the vehicle is described herein as an aircraft, in other implementations, the vehicle may be an automobile, an unmanned autonomous vehicle (e.g., a drone), a ship, a rocket, a helicopter, or another type of vehicle. The system 100 may be integrated within an electronic device, such as a computer or computing device (e.g., a FMC, a flight dispatch computer, a desktop computer, a tablet computer, a laptop computer or a notebook computer, a network computer, etc.), a controller of a vehicle, a server, a mobile telephone, a personal digital assistant (PDA), any other electronic device, or any combination thereof, as illustrative, non-limiting examples.

The system 100 includes a position sensor 102, a processor 104, a memory 106, an input device 108, and a display device 110. An apparatus 101 for determining an additional load capacity of the vehicle includes the processor 104 and the memory 106, where processor is configured to perform the methods described herein. Accordingly, the system 100 includes the apparatus 101, the position sensor 102, the input device 108, and the display device 110. The position sensor 102 is coupled to the processor 104, and the processor 104 is coupled to each of the memory 106, the input device 108, and the display device 110. Although the position sensor 102, the processor 104, the memory 106, the input device 108, and the display device 110 are illustrated in FIG. 1 as being part of the system 100, in other implementations, the position sensor 102, the input device 108, the display device 110, or a combination thereof, may be external to and coupled to the system 100.

The position sensor 102 is configured to determine position data 112 that represents a location associated with the aircraft. The position data 112 may indicate a latitude associated with the aircraft, a longitude associated with the aircraft, an altitude associated with the aircraft, other forms of position data, or a combination thereof. For convenience, the operations of the system 100 are described with respect to the latitude associated with the aircraft. In other implementations, the operations of the system 100 may be based on the longitude associated with the aircraft or based on the latitude and the longitude.

In a particular implementation, the position sensor 102 includes one or more GPS sensors, and the position data 112 includes or corresponds to GPS data. In another particular implementation, the position sensor 102 includes one or more inertial navigation units (e.g., an accelerometer, a gyroscope, one or more other motion sensors or rotation sensors, or a combination thereof), and the position data 112 includes or corresponds to inertial sensor data. In another particular implementation, the position sensor 102 includes one or more GPS sensors and one or more inertial navigation units. In other implementations, the position sensor 102 includes other types of position sensors.

The processor 104 includes an interface 120 and an input/output (I/O) interface 122. The interface 120 is configured to enable communication with (e.g., to send data to, to receive data from, or both) the position sensor 102. For example, the interface 120 may be configured to receive the position data 112. The I/O interface 122 is configured to enable communication with one or more I/O devices, such as the input device 108 and the display device 110.

In a particular implementation, the I/O interface 122 is configured to initiate display of an estimated current location (e.g., a location determined based on the position data 112) of the aircraft at the display device 110 and to receive input data responsive to display of the estimated current location, as further described with reference to FIG. 3. In this implementation, a current location of the aircraft may be determined based on the input data, as further described herein. For example, the current location is determined to be the estimated current location based on a confirmation indicated by the input data, as further described herein. Alternatively, the current location is determined to be a location indicated by the input data, as further described herein. Although illustrated as a single I/O interface, in other implementations the I/O interface 122 may include multiple I/O interfaces. Although described as being part of the processor 104, in other implementations the interface 120, the I/O interface 122, or both are external to or distinct from the processor 104 and in communication with or coupled to the processor 104 via a wired connection(s), a wireless connection(s), or a combination thereof.

The processor 104 is configured to execute one or more instructions 130 stored at the memory 106 to perform the operations described herein. The memory 106 includes or corresponds to a computer-readable medium (e.g., a hard drive) that is configured to store data, instructions, or both. For example, the memory 106 is configured to store the instructions 130. In some implementations, the memory 106 is also configured to store a threshold weight 128, a reference OEW 132, and OEW data 133 that indicates multiple OEW values. In a particular implementation, the OEW values are stored in a data structure, such as a table, and are indexed by latitude, by longitude, by altitude, or a combination thereof, as further described herein.

The input device 108 is configured to receive an input (e.g., a user input) and to generate input data 144 based on the input. For example, the input device 108 may include or correspond to a keyboard, a touchscreen, a mouse, or another input device that is configured to generate the input data 144 based on the input. The input data 144 may indicate a target location, a target altitude, or both, as further described herein. The I/O interface 122 is configured to receive the input data 144 from the input device 108.

The display device 110 is configured to display an output based on information received from the processor 104. For example, the display device 110 may include or correspond to a screen, a monitor, a television, a touchscreen, or another type of display device.

In a particular implementation, the system 100 is integrated within a FMC, as further described with reference to FIGS. 2A, 2B, and 3. In another particular implementation, the system 100 is integrated within a flight dispatch system, as further described with reference to FIG. 4. In another particular implementation, the system 100 is integrated within a computing device that is configured to display at least one adjusted range circle that is overlaid on a map, as further described with reference to FIG. 5.

During operation, the processor 104 may initiate generation of a graphical user interface (GUI) at the display device 110. The GUI includes a selectable indicator associated with determination of an adjusted OEW, as further described herein. A user (e.g., a pilot, a co-pilot, an air traffic controller, etc.) may use the input device 108 to select the selectable indicator. Based on an input received by the input device 108, the input device 108 generates the input data 144. In a particular implementation, the input data 144 indicates that an adjusted OEW is to be generated. In another implementation, the input data 144 also indicates a target location (e.g., a location associated with operation of the aircraft), a target altitude (e.g., an altitude associated with operation of the aircraft), or both, that is input by the user via the input device 108 (e.g., a keyboard, a touchscreen, etc.). The input device 108 sends the input data 144 to the processor 104 via the I/O interface 122. In another particular implementation, flight plan data is loaded at or provided to the processor 104 as the input data 144 by someone other than the user (e.g., a technician, a designer, etc.).

Responsive to the input data 144 indicating that an adjusted OEW is to be generated, the processor 104 generates an initial weight estimate 124 based on the reference OEW 132 and at least one of a latitude or an altitude associated with the aircraft at a first location (e.g., a current location or a target location of operation of the aircraft). In an alternate implementation, the processor 104 generates the initial weight estimate 124 without receiving a request.

Additionally or alternatively, the initial weight estimate 124 may be determined based on the longitude associated with the aircraft at the first location, other location data, or a combination thereof. For example, the initial weight estimate 124 may be based on longitude, latitude and longitude, latitude and altitude, longitude and altitude, or latitude, longitude, and altitude. Additionally or alternatively, the initial weight estimate 124 can be based on vertical deflection values, as further described herein. For example, the initial weight estimate 124 may be determined based on latitude, longitude, altitude, vertical deflection values, or a combination thereof. The initial weight estimate 124 may be more precise if the initial weight estimate 124 is determined based on the longitude, the vertical deflection values, or both (in addition to the latitude and the altitude). However, because longitude and vertical deflection may have a very small effect on the gravitational field of the Earth (and thus on the initial weight estimate 124), in some implementations longitude and vertical deflection are ignored (e.g., the initial weight estimate 124 is not based on longitude or vertical deflection).

The reference OEW 132 represents a predetermined OEW associated with the aircraft that is measured at a second location (e.g., a location of manufacture of the aircraft, a location of delivery of the aircraft, or a location of weighing of the aircraft) that is different from the first location. The reference OEW 132 may be stored at the memory 106 after the aircraft is weighed at the second location. Additionally or alternatively, the reference OEW 132 may be designated in a flight manual or other documentation associated with the aircraft, and the user may input the reference OEW 132 using the input device 108.

The latitude may be indicated by the position data 112. In a particular implementation, the processor 104 receives the position data 112 from the position sensor 102 via the interface 120. In some implementations, the position data 112 is received by the processor 104 at periodic intervals. In other implementations, the position data 112 is received by the processor 104 when requested. Alternatively, the latitude may be indicated by the input data 144 (e.g., when the current location is input via the input device 108).

The processor 104 generates the initial weight estimate 124 for the aircraft based on the reference OEW 132 and at least one of the latitude or the altitude associated with the aircraft at the first location. For example, the processor 104 may retrieve the reference OEW 132 from the memory 106 and adjust the reference OEW 132 based on the latitude, the altitude, or both, to generate the initial weight estimate 124. In other implementations, the processor 104 calculates the initial weight estimate 124 based on the at least one of the latitude, the altitude, or both. In a particular implementation, the processor 104 determines the initial weight estimate 124 based on the latitude associated with the aircraft at the first location (or a target latitude). In another particular implementation, the processor 104 determines the initial weight estimate 124 based on the altitude associated with the aircraft at the first location (or based on a target altitude during flight, such as a target cruising altitude). In another particular implementation, the processor 104 determines the initial weight estimate 124 based on the latitude and the altitude. In some implementations, the initial weight estimate 124 is determined based on a latitude range that includes the latitude, an altitude range that includes the altitude, or both. In other implementations, the initial weight estimate 124 is determined based on a longitude range, another position range, a motion range, a rotation range, other data or ranges, or a combination thereof.

In a particular implementation, the initial weight estimate 124 accounts for variations in the gravitational field of the Earth due to latitude. To illustrate, because the Earth is an ellipsoid, the radius of the Earth at a particular latitude is given by the following equation:

$$R(\phi) = \sqrt{\frac{(\bar{a}^2\cos(\phi))^2 + (\bar{b}^2\sin(\phi))^2}{(\bar{a}\cos(\phi))^2 + (\bar{b}\sin(\phi))^2}},$$ (Equation 1)

where $R(\Phi)$ is the radius of the Earth, $\bar{a}$ is the semi-major radius of the Earth (i.e., 3963.18 miles or 6,378.137 kilometers (km)), $\bar{b}$ is the semi-minor radius of the Earth (i.e., 3949.90 miles or 6,356.7523 km), and $\Phi$ is the latitude (as measured using the World Geodetic System (WGS-84) coordinate system).

Newton's law of gravity demonstrates that the strength of the gravitational force between two objects (e.g., the aircraft and the Earth) is based on the masses of the objects and the distance between the two objects. Thus, the gravitational force exerted on the aircraft by the Earth is based on the radius of the Earth at the location associated with the aircraft. Because the weight of the object is based on the gravitational force exerted on the aircraft by the Earth, the weight of the aircraft is based on the radius of the Earth at the location associated with the aircraft. Thus, the magnitude of the gravitational force (and the weight) of the aircraft is based on the latitude associated with the aircraft. To illustrate, the acceleration due to gravity can be determined using the following equation:

$$g(\phi) = \left(9.7803267714 * \frac{1 + 0.00193185138639 \sin^2(\phi)}{\sqrt{1 - 0.00669437999013 \sin^2(\phi)}}\right),$$ (Equation 2)

where $g(\Phi)$ is the acceleration due to gravity (in meters per seconds squared (m/sec$^2$)), and $\Phi$ is the geographic latitude of the aircraft measured using the WGS-84 coordinate system.

Based on Equation 2, the acceleration due to gravity (and the magnitude of the gravitational force) varies based on the latitude associated with the aircraft. Because the weight of the aircraft corresponds to the mass of the aircraft multiplied by the force of gravity exerted on the aircraft, the weight of the aircraft varies with latitude. Thus, an initial weight of the aircraft at a first location is based on the latitude associated with the first location, and the reference OEW 132 is based on the latitude associated with the second location. As an example, the OEW of the aircraft at the first location (e.g., the current location or the target location of operation) may be approximately 0.3% less than the OEW of the aircraft at the second location (e.g., the weighing location) due to a difference in latitude of approximately 50 degrees between the first location and the second location.

The processor 104 may generate the initial weight estimate 124 based on the reference OEW 132 and the latitude of the aircraft at the first location. In a particular implementation, the processor 104 calculates the initial weight estimate 124 by determining an adjustment factor and modifying the reference OEW 132 based on the adjustment factor to generate the initial weight estimate 124.

In another particular implementation, the processor 104 retrieves an OEW from a plurality of stored OEW values at the memory 106 based on the reference OEW 132 and the latitude. To illustrate, the memory 106 may store OEW data 133 that includes a first OEW value 134 ("OEW Value 0"), a second OEW value 136 ("OEW Value 1"), and an Nth OEW value 138 ("OEW VALUE N"). The stored OEW values may be stored in a data structure, such as a table, and may be indexed by the latitude, the reference OEW 132, or both. In a particular implementation, each OEW value indicated by the OEW data 133 is indexed by a latitude value and a reference OEW value. In another particular implementation, the OEW data 133 corresponds to multiple tables of OEW values, each OEW table indexed by a reference OEW value, and each OEW value in a particular table indexed by a corresponding latitude value. The processor 104 retrieves an OEW value based on the latitude, the reference OEW 132, or both. For example, responsive to determining that the index ("Index 1") of the second OEW value 136 matches the latitude, the reference OEW 132, or both, the processor 104 retrieves the second OEW value 136 from the memory 106. The retrieved OEW value may be used as the initial weight estimate 124. In another particular implementation, the OEW data 133 represents a plurality of adjustment factors, and the processor 104 retrieves an adjustment factor based on the latitude. After retrieving the adjustment factor, the processor 104 applies the adjustment factor to the reference OEW 132 to calculate the initial weight estimate 124.

In another particular implementation, the processor 104 performs interpolation to determine the initial weight estimate 124. To illustrate, if the latitude is between two indexed latitude values, the processor 104 interpolates stored OEW values that correspond to the two indexed latitude values. For example, if the latitude determined by the processor 104 is greater than the first index value ("Index 0") and less than the second index value ("Index 1"), the processor 104 may interpolate the first OEW value 134 and the second OEW value 136 to determine the initial weight estimate 124. In other implementations, the processor 104 may interpolate OEW values that are indexed by latitude, altitude, longitude, vertical deflection values, or a combination thereof, to determine the initial weight estimate 124.

In another particular implementation, the initial weight estimate 124 is based on the altitude associated with the aircraft (or the target altitude) such that variations in the gravitational field of the Earth (e.g., variations in the acceleration caused by gravity) due to altitude are accounted for. For example, the acceleration caused by gravity may be calculated using the following equation:

$$g_h(\phi) = g_\phi \left( \frac{r_e(\phi)}{r_e(\phi) + h} \right)^2, \quad \text{(Equation 3)}$$

where $g_h(\Phi)$ is the acceleration caused by gravity at an altitude h, $g_\Phi$ is the acceleration caused by gravity at mean sea-level for a particular latitude (e.g., a latitude of the location of operation of the aircraft), and $r_e(\Phi)$) is the radius of the Earth at the particular latitude.

Based on Equation 3, the acceleration caused by gravity varies based on the altitude (or the target altitude) of the aircraft. Because the weight of the aircraft corresponds to the mass of the aircraft multiplied by the force of gravity on the aircraft, the weight of the aircraft varies with altitude. Thus, an initial weight of the aircraft is based on the altitude of the aircraft (or the target altitude, such as the target cruising altitude).

Because the altitude affects the weight of the aircraft, the processor 104 may generate the initial weight estimate 124 based on the reference OEW 132 and the altitude associated with the aircraft. As used herein, the altitude associated with the aircraft refers to the altitude associated with the aircraft at a particular location or a target altitude during operation of the aircraft, such as a target cruising altitude. In a particular implementation, the processor 104 calculates the initial weight estimate 124 by determining an adjustment factor (based on Equation 3) and modifying the reference OEW 132 based on the adjustment factor to generate the initial weight estimate 124. In another particular implementation, the processor 104 retrieves an OEW from a plurality of stored OEW values at the memory 106 based on the reference OEW 132 and the altitude. For example, the OEW data 133 may represent multiple OEW values that are indexed based on altitude and reference OEW value, and a particular OEW value may be retrieved based on the reference OEW 132 and the altitude. In another particular implementation, the OEW data 133 represents a plurality of adjustment factors, and the processor 104 retrieves an adjustment factor based on the altitude and applies the adjustment factor to the reference OEW 132 to calculate the initial weight estimate 124. In another particular implementation, if the target cruise altitude is between two indexed altitude values, the processor 104 interpolates the two OEW values that correspond to the two indexed altitude values to determine the initial weight estimate 124.

In other implementations, the initial weight estimate 124 is generated based on the reference OEW 132, and both the latitude associated with the aircraft (e.g., at the first location or at a target location along a flight path associated with the aircraft) and the altitude associated with the aircraft. In some implementations, the processor 104 generates a first weight estimate by adjusting the reference OEW 132 based on the latitude (or the altitude), and the processor 104 generates the initial weight estimate 124 by adjusting the first weight estimate based on the altitude (or the latitude). In an alternate implementation, the processor calculates the initial weight estimate 124 based on both the latitude and the altitude. To illustrate, the acceleration due to gravity based on both the latitude and the altitude may be determined based on the following equation:

$$g_{h,\phi} = \left( 9.7803267714 * \frac{1 + 0.00193185138639 \sin^2(\phi)}{\sqrt{1 - 0.00669437999013 \sin^2(\phi)}} \right) * \quad \text{(Equation 4)}$$

$$\left( \frac{\sqrt{\frac{(\overline{a}^2 \cos\phi)^2 + (\overline{b}^2 \sin\phi)^2}{(\overline{a}\cos\phi)^2 + (b\sin\phi)^2}}}{\sqrt{\frac{(\overline{a}^2 \cos\phi)^2 + (\overline{b}^2 \sin\phi)^2}{(\overline{a}\cos\phi)^2 + (b\sin\phi)^2}} + h} \right)^2 ,$$

where $g_{h,\Phi}$ is the acceleration due to gravity (in m/sec$^2$) of the aircraft at altitude h and at geographic latitude $\Phi$ (using the WGS-84 coordinate system), $\overline{a}$ is the semi-major radius of the Earth (i.e., 6,378.137 km), and $\overline{b}$ is the semi-minor radius of the Earth (i.e., 6,356.7523 km). In a particular implementation, the processor 104 calculates the initial weight estimate 124 based on the acceleration due to gravity associated with the latitude and the longitude.

Although the initial weight estimate 124 is described herein as being determined based on the latitude associated with the aircraft, in some implementations the initial weight estimate 124 is also based on the longitude associated with the aircraft. For example, the OEW data 133 may represent OEW values that are indexed by longitude, by latitude and longitude, or by latitude, longitude, and altitude. Additionally or alternatively, the initial weight estimate 124 can be based on vertical deflection values. Vertical deflection values represent a deviation in the direction of the Earth's gravitational field caused by the presence of geographic features, such as mountains or large bodies of water. For example, a deviation in the direction of the gravitational field caused by a large body of water may be small (e.g., approximately 0.002 degrees), and a deviation caused by a mountain may be larger (e.g., approximately 0.036 degrees).

The vertical deflection values associated with various latitudes, longitudes, or both may be stored at the memory 106, or the OEW data 133 may represent OEW values that are based on latitude, longitude, altitude, vertical deflection values, or a combination thereof. Thus, the initial weight estimate 124 may be more precise if the initial weight estimate 124 is generated based additionally on the longitude, the vertical deflection, or both. However, because longitude and the vertical deflection may have a very small effect on the variation of the gravitational field of the Earth (and thus the weight of the aircraft), in some implementations longitude and the vertical deflection are ignored (e.g., the initial weight estimate 124 is not based on the longitude or the vertical deflection).

After determining the initial weight estimate 124, the processor 104 determines an additional load capability 126 of the aircraft based on a difference between the initial weight estimate 124 and the reference OEW 132. In a particular implementation, the additional load capability 126 is determined by subtracting the initial weight estimate 124 from the reference OEW 132. The difference between the initial weight estimate 124 and the reference OEW 132 represents a weight of additional payload that can be carried by the aircraft without causing the aircraft to exceed a criterion. For example, the criterion may be a maximum takeoff weight (MTOW) (e.g., a maximum weight of the aircraft after the cargo, crew, fuel, passengers, etc., are loaded onto the aircraft) that is specified by a manufacturer, MTOW specified in flight manual associated with the aircraft, rules associated with an airport at which the aircraft is to take off or land, or some other criterion. To illustrate, if a first takeoff weight (TOW) (e.g., a weight of the aircraft after the aircraft is loaded for operation) of the aircraft at the first location (e.g., the current location or the location of operation) is 990 kilograms (kg) less than a second TOW of the same aircraft at the second location (e.g., the location of manufacture, delivery, or weighing), then the aircraft is capable of carrying an additional 990 kg of payload without exceeding a particular MTOW at latitudes that are the same (or within the same latitude range) as the latitude associated with the first location. As another example, if the first TOW of the aircraft at the first location is 575 kg more than the second TOW of the same aircraft at the second location, then the aircraft should be loaded with 575 kg less payload in order to meet the criterion.

The additional load capability 126 represents an additional amount (e.g., weight) of payload that may be loaded onto the aircraft without exceeding a criterion, such as a MTOW. The additional load capability 126 may correspond to an additional fuel storage capability of the aircraft, an additional payload (e.g., cargo) storage capability of the aircraft, an additional passenger carrying capability of the aircraft, etc. In a particular implementation, the additional fuel storage capability corresponds to an increased maximum flight range of the aircraft. For example, an additional storage capability of approximately 1700 kg of fuel may be associated with an increased maximum flight range of approximately 600 km. In another particular implementation, the additional load capability 126 is associated with an additional number of passengers that can be carried by the aircraft. For example, an additional storage capability of approximately 500 kg may be associated with the capability to carry four additional passengers. In some implementations, the processor 104 compares the initial weight estimate 124 to the threshold weight 128 (e.g., a MTOW, a target TOW, or another threshold weight) to determine a total load capability for the aircraft. For example, if the threshold weight 128 is approximately 300,000 kg and the initial weight estimate 124 is approximately 138,000 kg, the total load capability is approximately 162,000 kg (e.g., the aircraft can carry approximately 162,000 kg of crew, cargo, fuel, passengers, etc.).

After determining the additional load capability 126, the processor 104 generates an output 140 that indicates the additional load capability 126. After generating the output 140, the processor 104 initiates display of the output 140 at the display device 110. In a particular implementation, the processor 104 initiates display of a GUI that indicates the additional load capability 126. The GUI may include an additional payload storage capability or an additional fuel storage capability and a corresponding increase in flight range, as non-limiting examples. The GUI is further described with reference to FIGS. 2A, 2B, and 3.

In some implementations, the processor 104 performs one or more performance analysis operations based on the latitude, the altitude, or both at locations of one or more airports associated with a flight plan. For example, initial weight estimates (including the initial weight estimate 124) of the aircraft are determined for the one or more airports, and one or more first performance analysis operations are performed based on the initial weight estimates of the aircraft. In a particular implementation, the first performance analysis operations include "low speed" performance analysis operations that generate low speed performance metrics, such as takeoff field length (TFOL), various speeds (e.g., stall speed, decision speed, rotation speed, liftoff speed, obstacle height speed, or a combination thereof) of the aircraft, other low speed performance metrics, or a combination thereof. The low speed performance metrics (or calculations thereof) may be specified or certified by a regulatory agency, such as the Federal Aviation Administration (FAA). As another example, initial weight estimates (including the initial weight estimate 124) of the aircraft are determined for various locations and altitudes of a flight path associated with the aircraft, and one or more second performance analysis operations are performed based on the initial weight estimates of the aircraft. In a particular implementation, the second performance analysis operations include "high speed" performance analysis operations that determine metrics, such as aircraft performance, operating cost, etc., during simulation of the flight.

The processor 104 generates a second output 146 that includes data representative of performance analysis results 148. The performance analysis results 148 may include results from low speed performance analysis operations, high speed performance analysis operations, or both. The processor 104 initiates display of the second output 146 at the display device 110. In a particular implementation, the performance analysis results 148 indicated by the second output 146 are displayed via the GUI (or via a second GUI). Additionally or alternatively, the processor 104 may store the data indicative of the performance analysis results 148 at the memory 106 or at another location.

In a particular implementation, one or more of the components of the system 100 may be used during a process of loading a vehicle (e.g., an aircraft). To illustrate, the processor 104 generates an initial weight estimate associated with the vehicle based on a reference OEW (e.g., the reference OEW 132) and at least one of a latitude or an altitude of the vehicle at a first location. The processor 104 determines an additional load capability (e.g., the 126) of the vehicle based on a difference between an initial weight estimate (e.g., the 124) and the reference OEW. The processor 104 generates an output that indicates the additional load capability. A reference load capability and the additional load capability (e.g., passengers, crew, furniture, fuel, payload, or a combination thereof, that weighs approximately the same as the sum of the reference load capability and the additional load capability) is loaded onto the vehicle. For example, the processor 104 may generate one or more displayable instructions to personnel (e.g., a flight crew, a ground crew, etc.) to instruct the personnel to load a particular weight of furniture, cargo, fuel, payload, passengers, crew, etc., onto the vehicle.

In another particular implementation, one or more components of the system 100 may perform operations to adjust an initial flight plan of an aircraft. To illustrate, the processor 104 generates an initial weight estimate associated with the aircraft based on a reference OEW (e.g., the reference OEW 132) and at least one of a latitude or an altitude of the aircraft at a first location. The processor 104 determines an additional load capability (e.g., the 126) of the aircraft based on a difference between an initial weight estimate (e.g., the 124) and the reference OEW. The processor 104 also adjusts the initial flight plan based on the additional load capability to generate an adjusted flight plan. For example, the additional load capability may include or correspond to an additional amount of fuel that can be loaded onto the aircraft, and the initial flight plan is adjusted by adjusting a flight path in the adjusted flight plan to be longer than a flight path in the initial flight plan based on the additional amount of fuel.

Thus, the system 100 may increase utility of a vehicle, such as an aircraft, and revenue to an owner of the vehicle. For example, the system 100 determines and indicates an additional load capability (e.g., an additional cargo capacity or an additional passenger capacity, as non-limiting examples) that can be loaded onto and carried by the vehicle without exceeding a particular criterion (e.g., the threshold weight 128). Increasing the amount of cargo or the number of passengers carried by the vehicle may increase revenue to an owner or operator of the vehicle, such as an airline. As another example, the system 100 determines and indicates an additional fuel capacity of the vehicle without exceeding the particular criterion. The additional fuel capacity corresponds to an increase to the maximum movement range of the vehicle. Increasing the movement range of the vehicle may increase the utility of the vehicle. As a particular example, increasing the maximum flight range of an aircraft (by loading more fuel onto the aircraft) enables the airline to offer flights to destinations that are located farther away from airports than destinations that are currently offered. Offering additional destinations may attract additional passengers, thereby increasing revenue to the airline.

In the above description, various functions performed by the system 100 of FIG. 1 are described as being performed by the processor 104 based on execution of the instructions 130. This is for illustration only. In an alternate implementation, one or more functions performed by the processor 104 are instead be performed by one or more hardware components. For example, a first component may generate the initial weight estimate 124 and a second component may determine the additional load capability 126 and may generate the output 140. Each component may be implemented using hardware (e.g., a field-programmable gate array (FPGA) device, an application-specific integrated circuit (ASIC), a digital signal processor (DSP), a controller, etc.), software (e.g., instructions executable by a processor), or a combination thereof.

FIGS. 2A and 2B illustrate examples of GUIs 200 and 210, respectively, that are used with the system 100. As a particular example, the GUIs 200 and 210 are displayable by the display device 110 of FIG. 1. As described herein the GUIs 200 and 210 are used with a flight management computer of an aircraft (or a computer that controls a different vehicle, such as a helicopter, an automated aircraft, a ship, etc.); however, the GUIs 200 and 210 can be used in any computer(s) that include the components of the system 100. In the implementations illustrated in FIGS. 2A and 2B, an initial weight estimate, an additional load capability, and an output are generated by the flight management computer (e.g., by a processor of the flight management computer). As an example, the initial weight estimate, the additional load capability, and the output may be the initial weight estimate 124, the additional load capability 126, and the output 140 of that are generated by the processor 104 of FIG. 1. In a particular implementation, each of the GUIs 200, 210 is displayed at a display device of the flight management computer.

Referring to FIG. 2A, the elements of the GUI 200 are displayed prior to a determination of an initial weight estimate (e.g., an adjusted OEW). Display of the GUI may be initiated by a processor, such as the processor 104 of FIG. 1. As illustrated in FIG. 2A, the GUI 200 displays a reference OEW 202. The reference OEW 202 represents a weight of the aircraft that is measured at a particular location (e.g., a location of manufacture, a location of delivery, or a different location where the aircraft is measured). As a non-limiting example, the reference OEW 202 may be approximately 138,000 kg.

The GUI 200 also displays a selectable indicator 204 that is associated with adjustment of the reference OEW 202 (e.g., generation of an initial weight estimate). Selection of the selectable indicator 204 to cause the flight management computer to adjust the reference OEW 202 to generate an initial weight estimate. For example, the flight management computer adjusts the reference OEW 202 responsive to a selection of the selectable indicator 204 via an input device, such as the input device 108 of FIG. 1. In a particular implementation, the flight management computer determines an amount to adjust the reference OEW 202 based on a current location (e.g., a latitude, a longitude, an altitude, or a combination thereof) indicated by one or more position sensors (e.g., one or more GPS sensors, one or more inertial navigation units, etc.), such as the position sensor 102 of FIG. 1. In other implementations, the current location is indicated by input data received from the input device, as further described with reference to FIG. 3.

FIG. 2B illustrates an example of an updated GUI 210 after the reference OEW 202 is adjusted. As illustrated in FIG. 2B, the GUI 210 displays an initial weight estimate 212 (e.g., an adjusted OEW). The initial weight estimate 212 may differ from the reference OEW 202 of FIG. 2A due to the difference in the strength of Earth's gravitational field between the particular location (e.g., the location associated with the reference OEW 202) and the current location (or a selected location). As a non-limiting example, the initial weight estimate 212 may be approximately 136,270 kg. The GUI 210 also displays an additional load capability of the aircraft due to the adjusted OEW. In a particular implementation, the GUI 210 displays an additional payload storage capability 214, an additional fuel storage capability 216, and an increased flight range 218 that corresponds to the additional fuel storage capability 216. In another particular implementation, the GUI 210 displays either the additional payload storage capability 214 or the additional fuel storage capability 216 (and increased flight range 218).

As an illustrative example illustrated in FIG. 2B, the additional payload storage capability 214 may be approximately 1730 kg (e.g., a difference between the reference OEW 202 and the initial weight estimate 212), the additional fuel storage capability 216 may be approximately 457 gallons of fuel (e.g., a volume of fuel that corresponds to the difference between the reference OEW 202 and the initial weight estimate 212), and the increased flight range 218 may be approximately 642 kilometers (km) (e.g., a flight range that is determined based on the additional fuel storage capability 216). In other implementations, the GUI 210 may include additional information, such as an additional passenger carrying capacity or other load capacity.

FIG. 3 illustrates a third example of a GUI 300 of a flight management computer, which includes at least some components of the system 100. As a particular example, the GUI 300 is displayable via the display device 110 of FIG. 1. In FIG. 3, the GUI 300 includes a current location indicator 302 that indicates a current location (or an approximate or estimated current location) of an aircraft determined by the flight management computer (e.g., based on one or more position sensors 102). The GUI 300 also includes a location field 304. The location field 304 enables entry of a different location for use in adjusting a reference OEW. Selectable indicators (e.g., checkboxes) associated with the current location indicator 302 and the location field 304 allow selection between accepting the estimated current location determined by the flight management computer or entering a different location. In a particular implementation, the estimated current location is determined based on information from a position sensor, such as the position sensor 102 of FIG. 1, and is an estimate based on the accuracy, precision, and tolerance of the position sensor. The different location entered via the location field 304 may be referred to as a current location (e.g., a location imported from a flight plan, a dispatcher, etc.) or a target location (or a location from where the vehicle is to depart).

The GUI 300 also includes an altitude field 306. The altitude field 306 enables entry of a target cruising altitude to be used in adjusting the reference OEW. In some implementations, the GUI 300 includes a current altitude indicator that indicates an estimated altitude of an aircraft determined by the flight management computer. In such implementations, the target altitude may be entered or the estimated altitude may be accepted. In another particular implementation, the GUI 300 includes the current location indicator 302 and the location field 304, the altitude field 306 is not included. In another particular implementation, the GUI 300 includes the altitude field 306, and the current location indicator 302 and the location field 304 are not included. In other implementations, the GUI 300 includes additional information and indicators, such as a longitude indicator and field, or other indicators and fields.

Although FIGS. 2A, 2B, and 3 have been described as flight management computers, in other implementations, the operations performed by the flight management computers may be performed by computers, controllers, etc. associated with other types of vehicles. For example, the operations performed by the flight management computers may be performed by a computing device that is associated with a helicopter, an unmanned aerial vehicle (e.g., a drone), a boat, an automobile, etc.

Figure 4:
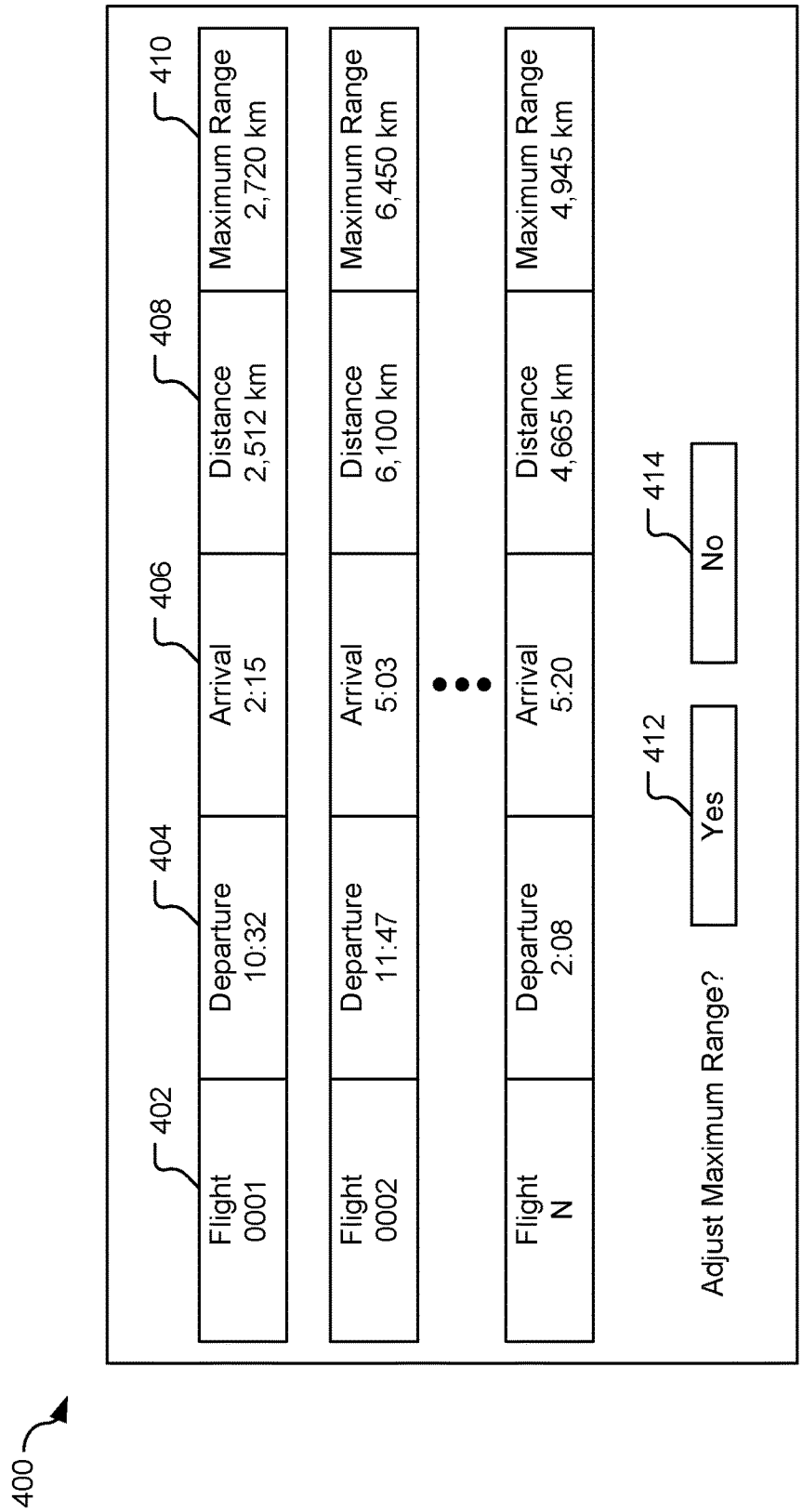
FIG. 4 is a diagram that illustrates an example of an interface of a flight dispatch system.

FIG. 4 illustrates an example of a GUI 400 of a flight dispatch system, which includes at least some components of the system 100. As a particular example, the GUI 400 is displayable via the display device 110 of FIG. 1. The flight dispatch system may be used by an aircraft controller or other user to schedule departures, arrivals, flight times, routes, and other attributes of air traffic. Although described as a flight dispatch system, in other implementations, the operations of the flight dispatch system may be performed by other vehicle dispatch or management systems, such as systems associated with unmanned aerial vehicles, helicopters, boats, etc.

The GUI 400 includes information for one or more aircraft flights. In the example illustrated in FIG. 4, the GUI 400 includes information for a first flight ("Flight 0001"), a second flight ("Flight 0002"), and an Nth flight ("Flight N"). In other implementations, information associated with more flights or fewer flights may be included in the GUI 400. In a particular implementation, the information associated with each flight includes a flight identifier, a departure time, an arrival time, a flight distance, and a maximum flight range of the aircraft. As a particular example, information associated with the first flight includes a first flight identifier 402, a first departure time 404, a first arrival time 406, a first flight distance 408, and a first maximum flight range 410. The values of the information in FIG. 4 are for example only and are not limiting. In other implementations, the GUI 400 may include less information or more information than illustrated in FIG. 4. For example, the GUI 400 may include cargo carrying capabilities associated with the flights, departure locations, arrival locations, weight information, fuel carrying capabilities, projected cruising altitudes, etc.

The GUI 400 also includes a first selectable icon 412 and a second selectable icon 414. Selection of the first selectable icon 412 (e.g., via an input device) may cause the flight dispatch system to modify the maximum flight ranges based on location (e.g., latitude, longitude, both, or a target location, as non-limiting examples), altitude (e.g., target cruising altitude or current altitude, as non-limiting examples), or both as described with reference to FIG. 1. For example, the first maximum flight range 410 may be increased if an initial weight estimate associated with an aircraft at the current location (or target location) is less than a reference OEW associated with the aircraft (e.g., a measured weight associated with the aircraft at a different location). Additionally, selection of the second selectable icon 414 may prevent adjustment of the maximum flight ranges. In other implementations, the GUI 400 also includes cargo carrying capabilities associated with the aircraft and selectable indicators that enable display of adjusted cargo carrying capabilities (e.g., based on location, altitude, or both), as described with reference to FIG. 1.

Figure 5:
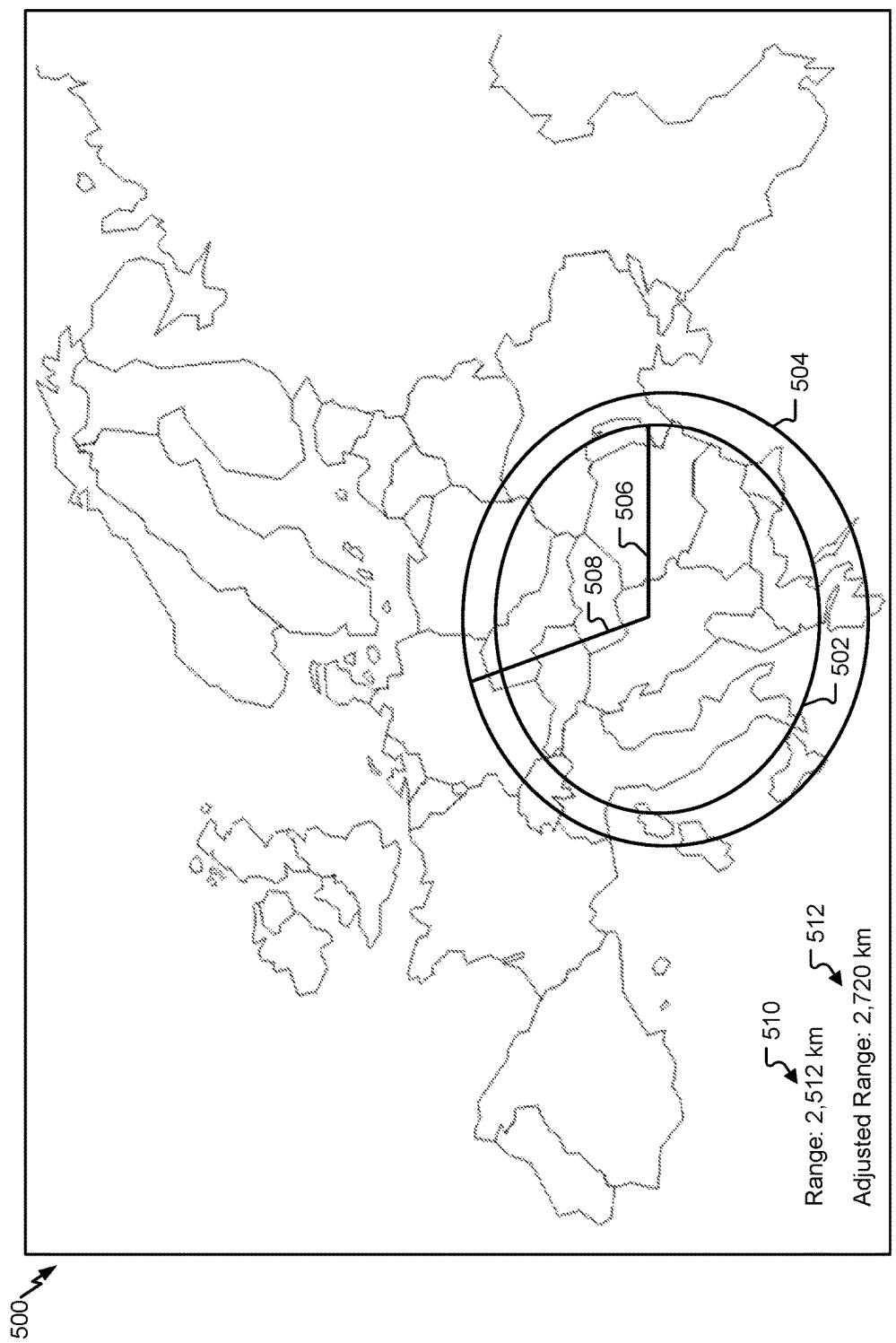
FIG. 5 is a diagram that illustrates an example of a display that includes a range circle.

FIG. 5 illustrates an example of a display 500 that includes at least one range circle. The display 500 may be generated by a computing device, such as a computer, a tablet computer, a mobile device, etc., in order to illustrate a range of the vehicle. In a particular implementation, the display 500 is generated at the display device 110 of FIG. 1. In another particular implementation, the vehicle is an aircraft. In other implementations, the vehicle is a different type of vehicle, such as a helicopter, an unmanned aerial vehicle, a boat, etc.

The display 500 includes a first range circle 502. The first range circle 502 illustrates an estimated range of the vehicle based on a reference OEW associated with the vehicle and measured at a particular location (e.g., a location at which the vehicle is weighed). A maximum fuel storage capability of the vehicle is determined based on the reference OEW, and an estimated maximum range of the vehicle is determined based on the maximum fuel storage capability. The maximum range corresponds to a first radius 506 of the first range circle 502. However, as described with reference to FIG. 1, a vehicle may be associated with an additional fuel storage capability when the vehicle is located or operated at a different location than the particular location. Thus, the display 500 also includes an adjusted range circle 504. The adjusted range circle 504 may also be referred to as a "corrected" range circle. The adjusted range circle 504 has a second radius 508 that corresponds to a maximum range of the vehicle based on an additional fuel storage capability due to the location, the altitude, or both of the vehicle. In a particular implementation, the range circles 502 and 504 are "wind corrected range circles" that account for effects on the maximum range of the vehicle due to wind conditions. In a particular implementation, the second radius 508 is determined based on the following equation:

$$R_{gravity}(\emptyset_{origin}, \lambda_{origin}, \bar{h}_{cruise}, R_{wind}(\psi)) = S(\emptyset_{origin}, \lambda_{origin}, \bar{h}_{cruise}, R_{wind}(\psi)) \cdot R_{wind}(\psi)$$ (Equation 5), where $\psi$ is the average heading on a "great circle route" from an origin point to a destination point, $R_{wind}$ is the wind adjusted range from the origin point along heading $\psi$ and at altitude h, $\emptyset$ is the latitude of a point in the WGS-84 coordinate system, $\lambda$ is the longitude of the point in the WGS-84 coordinate system, $\bar{h}$ is the average cruise altitude, $R_{gravity}$ is the adjusted radius (e.g., based on latitude, longitude, and altitude), and S is a serogate factor. The serogate factor S may be determined based on the following equation:

$$S(\emptyset_{origin}, \lambda_{origin}, \bar{h}_{cruise}, R_{wind}(\psi)) = f(\psi = f(\emptyset_{origin}, \emptyset_{destination}, \lambda_{origin}, \lambda_{destination}), \bar{h}_{cruise})$$ (Equation 6).

The display also includes a first range indicator 510 and a second range indicator 512. The first range indicator 510 is associated with the range of the vehicle that is determined before determining the additional fuel storage capability, and the second range indicator 512 is associated with the adjusted range that is determined based on the additional fuel storage capability. In other implementations, the display 500 includes less information. For example, the display 500 may not include the first range circle 502, the first radius 506, and the first range indicator 510. In other implementations, the display 500 includes additional information.

FIG. 6 illustrates an example a vehicle 600. In a particular implementation, the vehicle 600 is an aircraft. In other implementations, the vehicle 600 is a different type of vehicle, such as an unmanned aerial vehicle, a helicopter, a ship, an automobile, etc. In a particular implementation, one or more of the components of the vehicle 600 include one or more components of the system 100 of FIG. 1.

The vehicle 600 includes a system 601. The vehicle 600 optionally includes additional components and systems 620, such as an airframe, an interior, one or more engines, other systems (e.g., a lift and propulsion system, an electrical system, a hydraulic system, an environmental system, a communication system, a fuel system, etc.), or a combination thereof. The system 601 includes a radio navigation receiver 602, a radio navigation system 604, a GPS processor 606, a GPS receiver 608, a display device 610, a flight management computer 612, an inertial navigation system 614, an air data computer 616, a magnetometer 618, and an input device 619. In a particular implementation, the system 601 includes or corresponds to the system 100 of FIG. 1. In other implementations, the vehicle 600 includes more components or fewer components than illustrated in FIG. 6. The vehicle 600 may be associated with a vehicle crew (e.g., a pilot, a co-pilot, etc.) that operate the vehicle 600 during transit, and vehicle dispatch personnel that prepare the vehicle 600 for transit or determine aspects of the transit, such as routes, arrival times, departure times, etc.

The radio navigation receiver 602 is configured to receive radio navigation data. For example, the radio navigation receiver 602 may include an instrument landing system (ILS) receiver, a very high frequency (VHF) omnidirectional range (VOR) receiver, a navigation data recorder (NDR) receiver, or another type of receiver. The radio navigation system 604 is configured to receive the radio navigation data from the radio navigation receiver 602 and to process the radio navigation data and provide the processed radio navigation data to the flight management computer 612.

The GPS receiver 608 is configured to receive GPS data. The GPS processor 606 is configured to process the GPS data received from the GPS receiver 608 and to provide the processed GPS data to the flight management computer 612. The inertial navigation system 614 is configured to determine a position of the vehicle 600 based on data received from one or more sensors, such as accelerometers, gyroscopes, or other types of motion sensors or rotation sensors. The position sensor 102 (shown in FIG. 1) includes the radio navigation receiver 602, the GPS receiver 608 and GPS processor 606, the inertial navigation system 614, or combination thereof.

The air data computer 616 is configured to perform one or more testing functions to calibrate one or more air data instruments. The magnetometer 618 is configured to measure a heading of the vehicle 600. The input device 619 is configured to receive an input and to generate input data based on the input. For example, the input device 619 may include a keyboard, a touchscreen, a joystick, knob(s), other types of input devices, or a combination thereof. In a particular implementation, the input device 619 includes or corresponds to the input device 108 of FIG. 1.

The flight management computer 612 is configured to receive data from each of the components 604, 606, 614, 616, 618, and 619, and to generate a mission plan for the vehicle (and to analyze progress of the vehicle during operation). In a particular implementation, the flight management computer 612 determines destination conditions and compatibilities, navigation information, performance data, weight and balance calculations, other information, or a combination thereof, in order to generate the mission plan or to analyze the progress of the vehicle. The flight management computer 612 includes a processor 613 and a memory 615. In a particular implementation, the flight management computer 612 includes or corresponds to the apparatus 101 of FIG. 1. For example, the processor 613 includes or corresponds to the processor 104 shown in FIG. 1, and the memory 615 includes or corresponds to the memory 106 shown in FIG. 1.

The flight management computer 612 is also configured to initiate display of one or more outputs at the display device 610, such as one or more GUIs. For example, the display device 610 may include or correspond to the display device 110 of FIG. 1, and the one or more outputs may include or correspond to the GUIs 200 and 210 of FIGS. 2A and 2B, the GUI 300 of FIG. 3, the GUI 400 of FIG. 4, or the display 500 of FIG. 5, as non-limiting examples. Displaying the one or more outputs (e.g., the one or more GUIs) may enable the vehicle crew to provide input or make selections related to the mission plan, such as via the input device 619. In some implementations, the flight management computer 612 is configured to adjust a reference OEW associated with the vehicle 600 and to determine an additional load capability of the vehicle 600, as described with reference to FIG. 1.

In a particular implementation, the vehicle 600, such as an aircraft, includes a positioning system configured to generate position data, an input device configured to receive input data, and a route management system. For example, the positioning system may include or correspond to the radio navigation receiver 602, the radio navigation system 604, the GPS processor 606, the GPS receiver 608, the inertial navigation system 614, the air data computer 616, the magnetometer 618, or a combination thereof. The input device may include or correspond to the input device 619, the display device 610, or both.

The system 601 can be a route management system that may include or correspond to the flight management computer 612. The route management system is configured to generate an initial weight estimate based on a reference OEW and at least one of a latitude or an altitude at a first location. The at least one of the latitude or the altitude may be indicated by the position data, the input data, or both, and the reference OEW is predetermined (e.g., measured at) a second location (e.g., a location of manufacture, a location of delivery, a location of weighing of the vehicle, etc.) that is distinct from the first location.

The route management system is also configured to determine an additional load capability based on a difference between the initial weight estimate and the reference OEW. The route management system is further configured to generate an output that indicates the additional load capability. For example, the route management system may determine the additional load capability 126 and generate the output 140, as described with reference to FIG. 1. In a particular implementation, the vehicle further includes a display device, such as the display device 610, configured to display the output. The output indicates an additional fuel storage capability, an additional payload storage capability, an adjusted estimated range, or a combination thereof.

Figure 7:
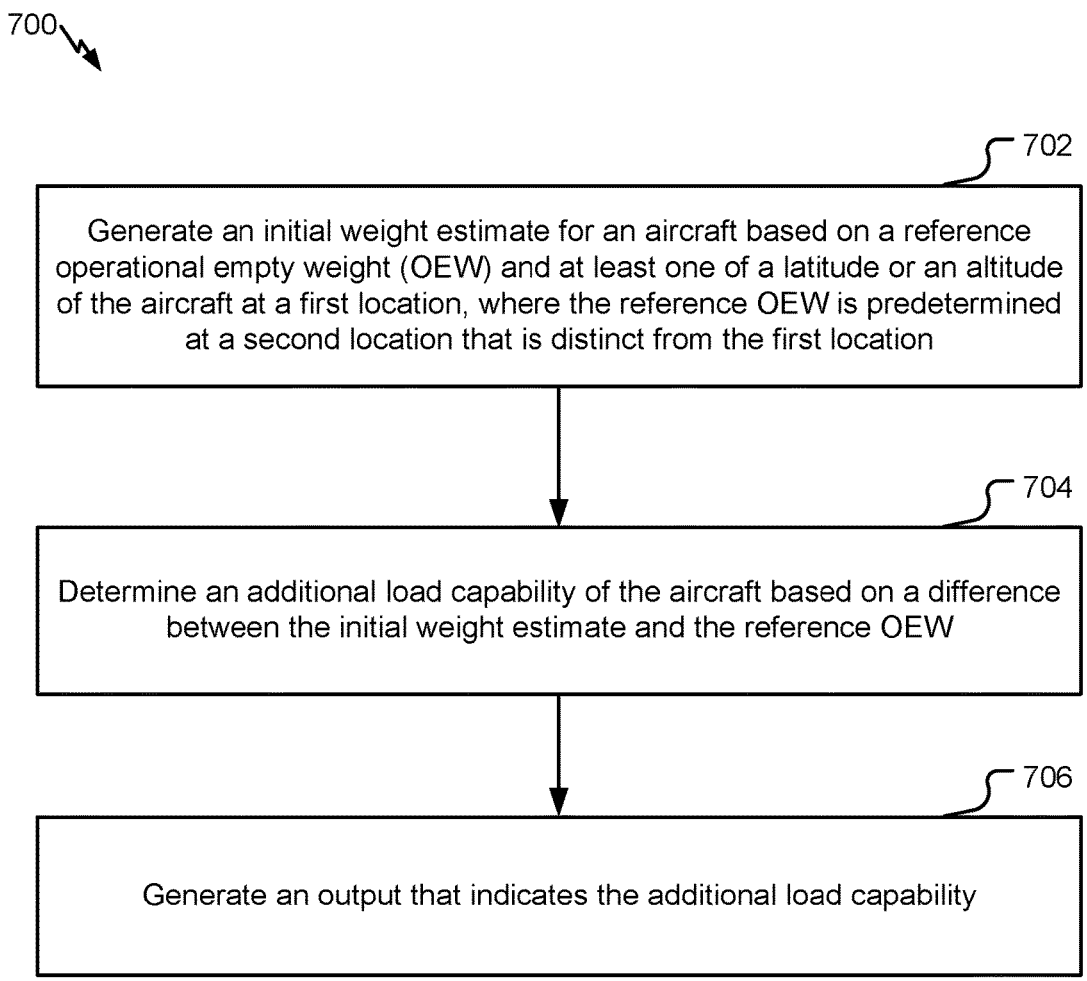
FIG. 7 is a flow chart of an example of a method of determining an additional load capability of a vehicle.

FIG. 7 illustrates a method 700 of determining an additional load capability of a vehicle. The method 700 may be performed by the system 100 of FIG. 1 (e.g., the processor 104), the vehicle 600 of FIG. 6 (e.g., the flight management computer 612), one or more devices or systems configured to output the GUI 200 of FIG. 2A, the GUI 210 of FIG. 2B, the GUI 300 of FIG. 3, the GUI 400 of FIG. 4, or the display 500 of FIG. 5, as non-limiting examples. In a particular implementation, the vehicle is an aircraft.

The method 700 includes generating an initial weight estimate associated with an aircraft based on a reference operational empty weight (OEW) and at least one of a latitude or an altitude of the aircraft at a first location, at 702. For example, the initial weight estimate may include or correspond to the initial weight estimate 124 and the reference OEW may include or correspond to the reference OEW 132 of FIG. 1. The reference OEW is predetermined (e.g., measured) at a second location that is distinct from the first location.

The method 700 includes determining an additional load capability of the aircraft based on a difference between the initial weight estimate and the reference OEW, at 704. For example, the additional load capability may include or correspond to the additional load capability 126 of FIG. 1.

The method 700 also includes generating an output that indicates the additional load capability, at 706. For example, the output may include or correspond to the output 140 of FIG. 1. In a particular implementation, the output is generated at a flight management computer, as described with reference to FIGS. 2A, 2B, and 3. In another particular implementation, the output is generated at a flight dispatch system, as described with reference to FIG. 4.

In a particular implementation, the method 700 further includes initiating display of the output at a display device. For example, the display device may include or correspond to the display device 110 of FIG. 1 or the display device 610 of FIG. 6. In another particular implementation, the additional load capability is determined further based on a longitude of the aircraft at the first location. In another particular implementation, the method 700 includes generating data representing an adjusted range circle that indicates an estimated maximum flight range of the aircraft from the first location. The estimated maximum flight range is based on the additional load capacity (e.g., the estimated maximum flight range is adjusted from a default value based on an additional fuel storage capacity). For example, the adjusted range circle may include or correspond to the corrected range circle 504 of FIG. 5.

In a particular implementation, generating the initial weight estimate includes modifying the reference OEW based on the latitude, the altitude, or both, as described with reference to FIG. 1. Determining the additional load capability includes determining an amount of additional fuel that can be stored on the aircraft without exceeding a threshold weight (e.g., the threshold weight 128 of FIG. 1) or a weight of an additional payload that can be stored on the aircraft without exceeding the threshold weight.

In another particular implementation, the method 700 includes generating performance analysis results associated with a flight plan based on the initial weight estimate and generating a second output that includes the performance analysis results. For example, the performance analysis results may include or correspond to the performance analysis results 148 and the second output may include or correspond to the second output 146 of FIG. 1.

In another particular implementation, the method 700 includes determining an estimated location of the aircraft based on position data received from a global positioning system sensor or from one or more inertial navigation units. For example, the position data may include or correspond to the position data 112 of FIG. 1, and the GPS sensor and the one or more inertial navigation units may include or correspond to the position sensor 102 of FIG. 1, or the GPS receiver 608 and the inertial navigation system 614 of FIG. 6, respectively. The method 700 also includes initiating display of the estimated location and receiving input data that indicates acceptance or rejection of the estimated location as the first location. For example, the input device may facilitate acceptance (or rejection) of the estimated location by interacting with a GUI, as described with reference to FIG. 3.

Further, the disclosure comprises implementations according to the following clauses:

Clause 1. A method to determine an additional load capacity of an aircraft, the method comprising: generating an initial weight estimate associated with the aircraft based on a reference operational empty weight (OEW) and at least one of a latitude or an altitude of the aircraft at a first location, wherein the reference OEW is predetermined at a second location that is distinct from the first location; determining an additional load capability of the aircraft based on a difference between the initial weight estimate and the reference OEW; and generating an output that indicates the additional load capability.

Clause 2. The method of Clause 1, further comprising initiating display of the output at a display device, wherein the additional load capability is determined further based on a longitude of the aircraft at the first location.

Clause 3. The method of Clauses 1 or 2, wherein the output is generated at a flight management computer.

Clause 4. The method of Clauses 1 or 2, wherein the output is generated at a flight dispatch system.

Clause 5. The method of Clauses 1 to 4, further comprising generating data representing a corrected range circle that indicates an estimated maximum flight range of the aircraft from the first location, wherein the estimated maximum flight range is based on the additional load capability.

Clause 6. The method of Clauses 1 to 5, wherein generating the initial weight estimate comprises modifying the reference OEW based on the latitude, the altitude, or both, and wherein determining the additional load capability comprises determining an amount of additional fuel that can be stored on the aircraft without exceeding a threshold weight or a weight of an additional payload that can be stored on the aircraft without exceeding the threshold weight.

Clause 7. The method of Clauses 1 to 6, further comprising: generating performance analysis results associated with a flight plan based on the initial weight estimate; and generating a second output that includes the performance analysis results.

Clause 8. The method of Clauses 1 to 7, further comprising: determining an estimated location of the aircraft based on position data received from a global positioning system (GPS) sensor or from one or more inertial navigation units; initiating display of the estimated location; and receiving input data that indicates acceptance or rejection of the estimated location as the first location.

Clause 9. An apparatus for determining an additional load capacity of an aircraft, the apparatus comprising: a processor; and a memory coupled to the processor, the memory storing instructions that, when executed by the processor, cause the processor to perform operations comprising the method of Clauses 1 to 8.

Clause 10. An apparatus for determining an additional load capacity of an aircraft, the apparatus comprising: a processor; and a memory coupled to the processor, the memory storing instructions that, when executed by the processor, cause the processor to perform operations comprising: generating an initial weight estimate associated with an aircraft based on a reference operational empty weight (OEW) and at least one of a latitude or an altitude of the aircraft at a first location, wherein the reference OEW is predetermined at a second location that is distinct from the first location; determining an additional load capability of the aircraft based on a difference between the initial weight estimate and the reference OEW; and generating an output that indicates the additional load capability.

Clause 11. The apparatus of Clause 10, wherein the additional load capability corresponds to an additional fuel storage capability of the aircraft.

Clause 12. The apparatus of Clauses 10 or 11, wherein the additional load capability corresponds to an additional payload storage capability of the aircraft.

Clause 13. The apparatus of Clauses 10 to 12, wherein the operations further comprise initiating display of the output at a display device.

Clause 14. The apparatus of Clauses 10 to 13, wherein the memory is further configured to store multiple OEW values, wherein the multiple OEW values are indexed by latitude, by altitude, or by both, and wherein generating the initial weight estimate includes retrieving an OEW value of the multiple OEW values from the memory based on the latitude, the altitude, or both.

Clause 15. The apparatus of Clauses 10 to 14, further comprising an interface configured to receive position data from a global positioning (GPS) sensor or from one or more inertial navigation units, and wherein the position data indicates the latitude.

Clause 16. The apparatus of Clauses 10 to 15, further comprising an input/output interface configured to receive input data from an input device, and wherein the input data indicates the latitude, the altitude, or both.

Clause 17. The apparatus of Clauses 10 to 16, further comprising an input/output interface configured to initiate display of an estimated current location and to receive input data responsive to display of the estimated current location, wherein the input data indicates acceptance of the estimated current location as the first location or a target location for the first location.

Clause 18. An aircraft comprising the apparatus of Clauses 10 to 17.

Clause 19. A system configured to determine an additional load capability of a vehicle, the system comprising: a position sensor; an input device; a display device; and the apparatus of Clauses 10 to 17.

Clause 20. A vehicle comprising: a positioning system configured to generate position data; an input device configured to receive input data; and a route management system configured to: generate an initial weight estimate based on a reference operational empty weight (OEW) and at least one of a latitude or an altitude at a first location, wherein at least one of the latitude or the altitude is indicated by the position data, the input data, or both, and wherein the reference OEW is predetermined at a second location that is distinct from the first location; determine an additional load capability based on a difference between the initial weight estimate and the reference OEW; and generate an output that indicates the additional load capability.

Clause 21. The vehicle of Clause 20, wherein the additional load capability corresponds to an additional fuel storage capability or an additional payload storage capability, and wherein the second location is a location of manufacture, a location of delivery, or a location of weighing of the vehicle.

Clause 22. The vehicle of Clause 21, further comprising a display device configured to display the output, wherein the output indicates the additional fuel storage capability, the additional payload storage capability, an adjusted estimated range, or a combination thereof.

Clause 23. The vehicle of Clauses 20 to 22, wherein the vehicle comprises an aircraft.

Clause 24. A system configured to determine an additional load capability of a vehicle, the system comprising: a processor; a position sensor coupled to the processor; an input device coupled to the processor; a display device coupled to the processor; and a memory coupled to the processor, the memory storing instructions that, when executed by the processor, cause the processor to perform operations comprising: generating an initial weight estimate associated with the vehicle based on a reference operational empty weight (OEW) and at least one of a latitude or an altitude of the vehicle at a first location, wherein the reference OEW is predetermined at a second location that is distinct from the first location; determining an additional load capability of the vehicle based on a difference between the initial weight estimate and the reference OEW; and generating an output that indicates the additional load capability, the output initiating the display device to display the additional load capability.

Clause 25. The system of Clause 24, wherein the position sensor is configured to determine position data that represents the first location associated with the vehicle, wherein the position data indicates the latitude of the vehicle at the first location, the longitude of the vehicle at the first location, an altitude associated with the vehicle, or a combination thereof.

Clause 26. The system of Clauses 24 or 25, wherein the position sensor comprises a radio navigation receiver, a GPS receiver and a GPS processor, an inertial navigation system, or combination thereof.

Clause 27. The system of Clauses 24 to 26, further comprising an input/output (I/O) interface, wherein the processor comprises the I/O interface.

Clause 28. The system of Clause 27, wherein the I/O interface is configured to initiate display of an estimated current location of the aircraft at the display device and to receive input data responsive to display of the estimated current location, the estimated current location based on position data acquired by the position sensor.

Clause 29. The system of Clauses 27 or 28, wherein the I/O interface is configured to receive input data from the input device and to send the input data to the processor, wherein the input data includes an adjusted OEW instruction, a target location, a target altitude, flight plan data, or combination thereof.

Clause 30. An aircraft comprising a flight management computer comprising the system of Clauses 24 to 29.

Clause 31. A route management system comprising the system of Clauses 24 to 29.

Clause 32. A method for loading an aircraft, the method comprising: generating an initial weight estimate associated with the aircraft based on a reference operational empty weight (OEW) and at least one of a latitude or an altitude of the aircraft at a first location, wherein the reference OEW is predetermined at a second location that is distinct from the first location; determining an additional load capability of the aircraft based on a difference between the initial weight estimate and the reference OEW; generating an output that indicates the additional load capability; and loading a reference load capability and the additional load capability on the aircraft.

Clause 33. A method for adjusting an initial flight plan of an aircraft, the method comprising: generating an initial weight estimate associated with the aircraft based on a reference operational empty weight (OEW) and at least one of a latitude or an altitude of the aircraft at a first location, wherein the reference OEW is predetermined at a second location that is distinct from the first location; determining an additional load capability of the aircraft based on a difference between the initial weight estimate and the reference OEW; and adjusting the initial flight plan based on the additional load capability to generate an adjusted flight plan.

Clause 34. The method of Clause 33, wherein the additional load capability is an additional amount of fuel, and wherein the adjusting comprises adjusting a flight path in the adjusted flight plan to be longer than a flight path in the initial flight plan based on the additional amount of fuel.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. A method comprising:
    generating an initial weight estimate associated with an aircraft based on a reference operational empty weight (OEW) and at least one of a latitude or an altitude of the aircraft at a first location, wherein the reference OEW is predetermined at a second location that is distinct from the first location;
    determining an additional load capability of the aircraft based on a difference between the initial weight estimate and the reference OEW;
    generating an output that indicates the additional load capability; and
    initiating a loading process to load the aircraft with additional payload, additional fuel, additional passengers, additional crew, or a combination thereof, that correspond to the additional load capability.

2. The method of claim 1, further comprising initiating display of the output at a display device, wherein the additional load capability is determined further based on a longitude of the aircraft at the first location.

3. The method of claim 1, wherein the output is generated at a flight management computer.

4. The method of claim 1, wherein the output is generated at a flight dispatch system.

5. The method of claim 1, further comprising generating data representing a corrected range circle that indicates an estimated maximum flight range of the aircraft from the first location, wherein the estimated maximum flight range is based on the additional load capability.

6. The method of claim 1, wherein generating the initial weight estimate comprises modifying the reference OEW based on the latitude, the altitude, or both, and wherein determining the additional load capability comprises determining an amount of additional fuel that can be stored on the aircraft without exceeding a threshold weight or a weight of an additional payload that can be stored on the aircraft without exceeding the threshold weight.

7. The method of claim 1, further comprising:
generating performance analysis results associated with a flight plan based on the initial weight estimate; and
generating a second output that includes the performance analysis results.

8. The method of claim 1, further comprising:
determining an estimated location of the aircraft based on position data received from a global positioning system (GPS) sensor or from one or more inertial navigation units;
initiating display of the estimated location; and
receiving input data that indicates acceptance or rejection of the estimated location as the first location.

9. The method of claim 1, wherein initiating the loading process comprises initiating display of an instruction to load the aircraft with the additional payload, the additional fuel, the additional passengers, the additional crew, or the combination thereof.

10. The method of claim 1, further comprising adjusting a flight plan by selecting a longer flight path than an original flight path, wherein the additional load capability corresponds to the additional fuel, and wherein the longer flight path corresponds to the additional fuel.

11. An apparatus comprising:
a processor; and
a memory coupled to the processor, the memory storing instructions that, when executed by the processor, cause the processor to perform operations comprising:
generating an initial weight estimate associated with an aircraft based on a reference operational empty weight (OEW) and at least one of a latitude or an altitude of the aircraft at a first location, wherein the reference OEW is predetermined at a second location that is distinct from the first location;
determining an additional load capability of the aircraft based on a difference between the initial weight estimate and the reference OEW;
generating an output that indicates the additional load capability; and
initiating a loading process to load the aircraft with additional payload, additional fuel, additional passengers, additional crew, or a combination thereof, that correspond to the additional load capability.

12. The apparatus of claim 11, wherein the operations further comprise initiating display of the output at a display device.

13. The apparatus of claim 11, wherein the memory is further configured to store multiple OEW values, wherein the multiple OEW values are indexed by latitude, by altitude, or by both, and wherein generating the initial weight estimate includes retrieving an OEW value of the multiple OEW values from the memory based on the latitude, the altitude, or both.

14. The apparatus of claim 11, further comprising an interface configured to receive position data from a global positioning (GPS) sensor or from one or more inertial navigation units, and wherein the position data indicates the latitude.

15. The apparatus of claim 11, further comprising an input/output interface configured to receive input data from an input device, and wherein the input data indicates the latitude, the altitude, or both.

16. The apparatus of claim 11, further comprising an input/output interface configured to initiate display of an estimated current location and to receive input data responsive to display of the estimated current location, wherein the input data indicates acceptance of the estimated current location as the first location or a target location for the first location.

17. A vehicle comprising:
a positioning system configured to generate position data;
an input device configured to receive input data; and
a route management system configured to:
generate an initial weight estimate based on a reference operational empty weight (OEW) and at least one of a latitude or an altitude at a first location, wherein at least one of the latitude or the altitude is indicated by the position data, the input data, or both, and wherein the reference OEW is predetermined at a second location that is distinct from the first location;
determine an additional load capability based on a difference between the initial weight estimate and the reference OEW;
generate an output that indicates the additional load capability; and
initiating a loading process to load the vehicle with additional payload, additional fuel, additional passengers, additional crew, or a combination thereof, that correspond to the additional load capability.

18. The vehicle of claim 17, wherein the additional load capability corresponds to an additional fuel storage capability or an additional payload storage capability, and wherein the second location is a location of manufacture, a location of delivery, or a location of weighing of the vehicle.

19. The vehicle of claim 18, further comprising a display device configured to display the output, wherein the output indicates the additional fuel storage capability, the additional payload storage capability, an adjusted estimated range, or a combination thereof.

20. The vehicle of claim 17, wherein the vehicle comprises an aircraft.

* * * * *